UNITED STATES PATENT OFFICE.

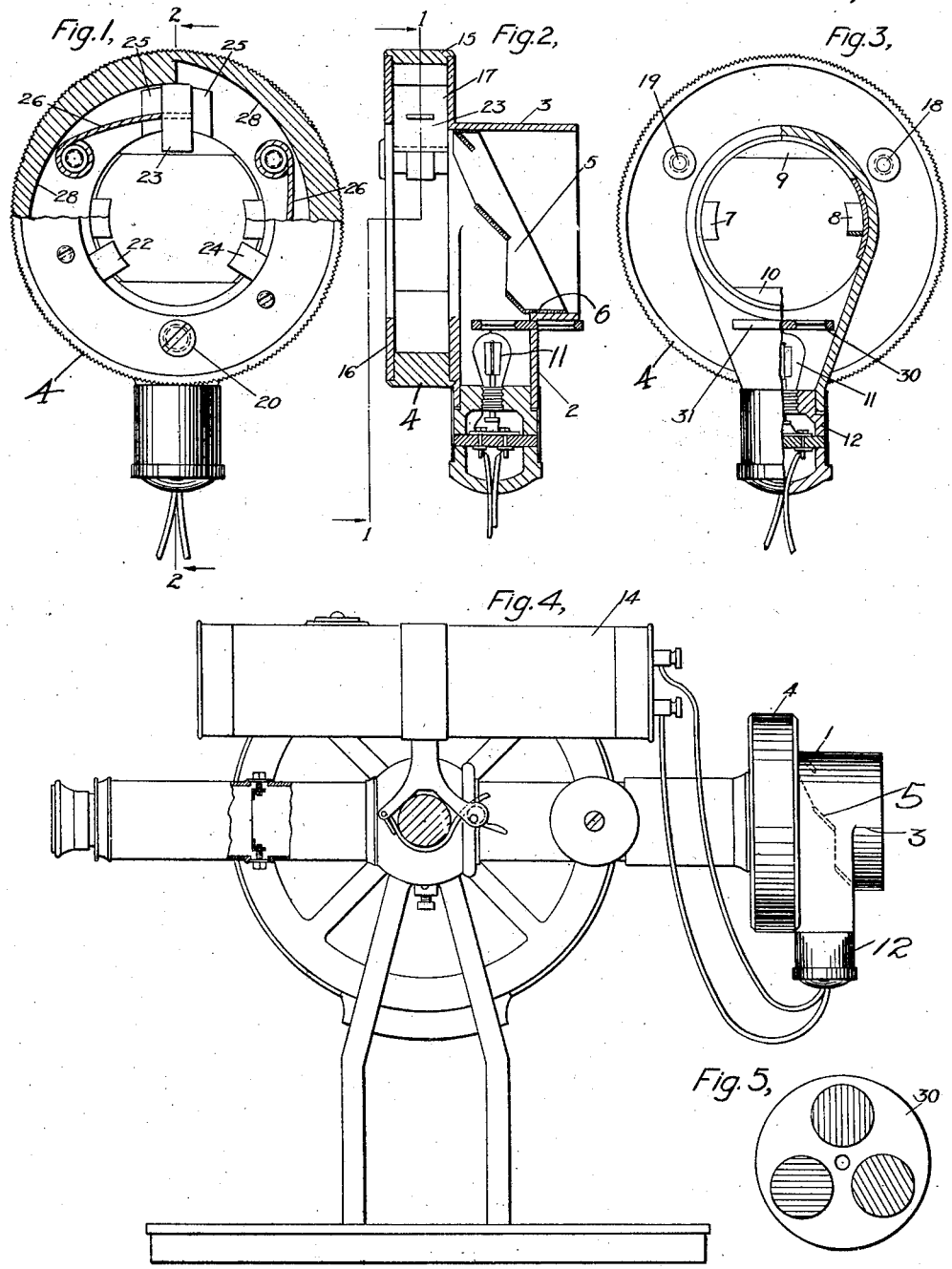

ELLIS LOVE BECK, OF MANOR, PENNSYLVANIA.

ILLUMINATING ATTACHMENT FOR TELESCOPES.

1,343,074.  Specification of Letters Patent.  Patented June 8, 1920.

Application filed February 11, 1919. Serial No. 276,252.

*To all whom it may concern:*

Be it known that I, ELLIS L. BECK, a citizen of the United States, and a resident of Manor, in the county of Westmoreland and State of Pennsylvania, have invented a new and Improved Illuminating Attachment for Telescopes, of which the following is a full, clear, and exact description.

The present invention relates to telescopes and aims to increase the utility thereof by providing an illuminating device for increasing the visibility of the cross hairs.

The invention provides means for introducing artificial light into a telescope such as those used on surveying instruments and the like, with the special object of illuminating the cross hairs of the instrument.

The nature and objects of the invention will more fully appear on inspection of the following specification and the accompanying drawings froming a part thereof.

In the drawings, in which is shown for the purposes of this specification an illustrative embodiment of the invention,—

Figure 1 is a rear view of a device embodying the invention, shown on the line 1—1 of Fig. 2, looking in the direction of the arrows;

Fig. 2 is a central sectional view taken on the line 2—2 of Fig. 1, looking in the direction of the arrows;

Fig. 3 is a front view of the device showing a partial section taken through the center of the light cell;

Fig. 4 is a view showing the device applied to the telescope of a surveying instrument; and Fig. 5 is a detail view of the light-shielding screen.

The illustrated embodiment of the invention is shown in Fig. 4 as applied to the telescope of a surveying instrument. The device comprises a concentric casing 1 having a depending radially extending inwardly enlarged light cell 2, a circular hood 3, and an attaching chuck 4—that is, the light cell 2 has an unrestricted outlet leading to the casing or hood at the objective end of the telescope. Within the hood 3 is mounted a reflector 5 to reflect light from the light cell into the end of the telescope to illuminate the cross hairs thereof. The reflector 5 may be of any desired or convenient form of construction; as shown, it comprises a ring 6 of a shape and size to fit frictionally and removably within the hood 3 and is provided with four inturned reflecting plates 7, 8, 9 and 10 which are positioned at such angles that they will reflect light from the light cell into the interior of the telescope to which the device is attached. I prefer to provide with each attachment several reflecting rings providing reflecting surfaces of different sizes, in order to suit different telescopes. It is also desirable, under different conditions of use, to use sometimes a reflector having a considerable reflecting surface and other times a reflector having less reflecting surface.

In the depending light cell is suitably mounted an artificial light; as shown, this consists of an electric bulb 11 which is mounted in a socket 12 which may be frictionally and removably connected to the light cell of the casing. The light conveniently may be supplied with the necessary current from a small dry battery, which may be mounted upon the surveying instrument, as indicated at 14 in Fig. 4.

The chuck for the attachment of the device to the end of a telescope may be of any suitable or desired form; as shown, the chuck comprises an annular cam 15 rotatably mounted between an annular end plate 16 and a face plate 17 of the casing. The annular plate 16 is held suitably spaced from the casing plate 17 by rivets or screws, as indicated at 18, 19 and 20. Between the plates are slidably mounted chuck jaws 22, 23 and 24 which are held in place between the plates by suitable guides 25, 25 and are yieldably urged outwardly by springs 26, 26 suitably mounted upon the spacing rivets or screws. The chuck jaws are operated by the rotatable annular cam 15, which is provided with three interior cam faces 28.

Under varying conditions of use of the device, it is sometimes desirable to decrease the amount of light introduced into the telescope from the artificial source. Accordingly, I provide means for modifying the light. Such means conveniently may consist of a rotatable disk 30 having different colored light screens in different sections thereof and rotatably mounted in such position that the several screens may be selectively rotated to position over the light and screen the same. To facilitate the operation of such disk, the same is mounted to project through a slot 31 in the side for manual operation.

In Fig. 5 is shown a detail view of the rotatable disk 30 in which are mounted three light screens of different density or different colors.

The device is shown and described with relation to a telescope, but it is obvious that the same, under certain conditions, would be useful as applied to microscopes and other instruments under special conditions of use. It is obvious, also, that the invention is not limited to a device requiring a reflector or to one applied at one end of the telescope. Also, by omission of the parts 5, 7, 8, 9 and 10 and using a light source of sufficiently high candle power, the reflected or indirect illumination from the plain walls of the interior of the casing 3 constituting the light hood, provides a soft diffused illumination, which permits the omission of the shutter 30.

Having thus described my invention, I claim as new and desire to secure by Letters Patent:

1. A device for illuminating the cross hairs of a telescope, comprising a casing having means for attaching it to a telescope and provided with a laterally extending light cell, a light in said cell, and a plurality of annularly arranged and inwardly projecting angular reflectors in the casing for reflecting the light into the telescope to which the device is applied.

2. A device for illuminating the cross hairs of a telescope, comprising a casing having a laterally extending light cell adapted to receive a source of light, a chuck carried by the casing for securing it to a telescope, a plurality of annularly arranged and inwardly extending angular reflecting surfaces in the casing for reflecting light into the telescope to which the device is attached, and a movable member having a plurality of screens of different density mounted in the light cell.

3. A device for illuminating the cross hairs of a telescope, including a casing, a chuck carried by said casing to attach the same to the end of a telescope, a source of light carried by said casing, and an annular element mounted in said casing substantially coaxially with the chuck and having a reflecting surface spaced from its axis and the axis of the chuck but positioned to reflect light from the source of light into the telescope.

4. An illuminating attachment for telescopes comprising a casing, interior clamping means for securing the attachment to the telescope, said casing being adapted to fit over the end of the telescope, and a source of light carried by the casing and communicating with the interior thereof in unrestricted relation, said casing being provided with a plurality of inwardly projecting reflecting surfaces adapted to project light into the telescope.

5. A device for illuminating the cross hairs of a telescope, comprising a casing adapted to fit over the end of a telescope and having means for detachably securing it to the telescope, said casing having a hood provided with a depending light cell, a plurality of reflecting surfaces in the hood, a light in the cell, and a rotatable member mounted in the light cell above the light and having a plurality of screens of different density.

ELLIS LOVE BECK.